Dec. 1, 1970 — T. Y. KORSGREN — 3,543,604
SELF-LOCKING, ADJUSTABLE LIMIT STOP MEANS FOR A CONTROL DEVICE
Filed Oct. 30, 1968 — 2 Sheets-Sheet 1
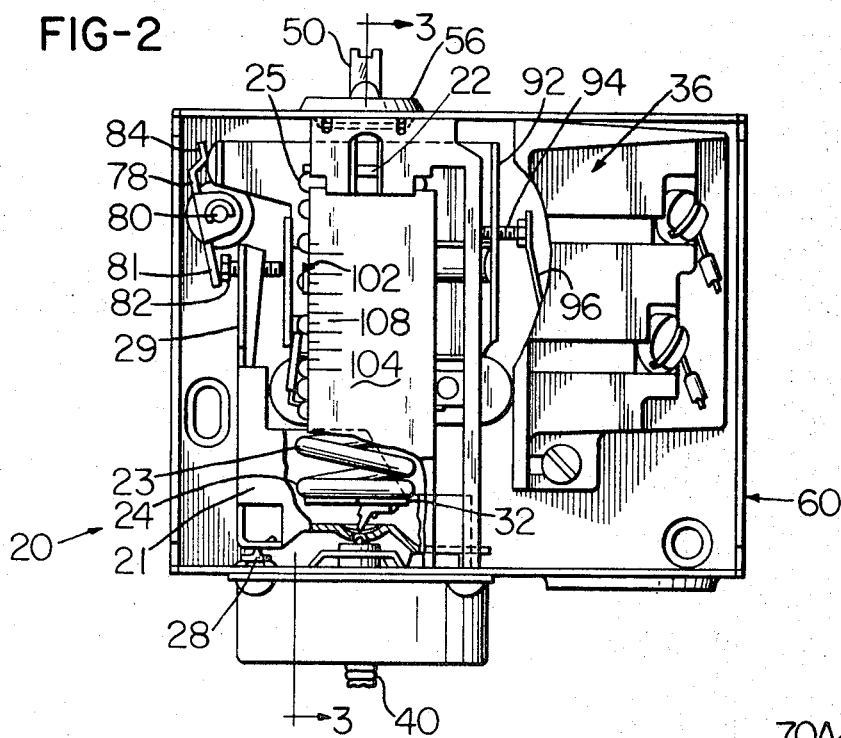
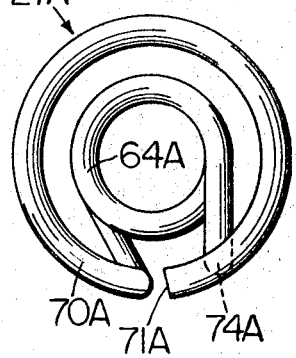
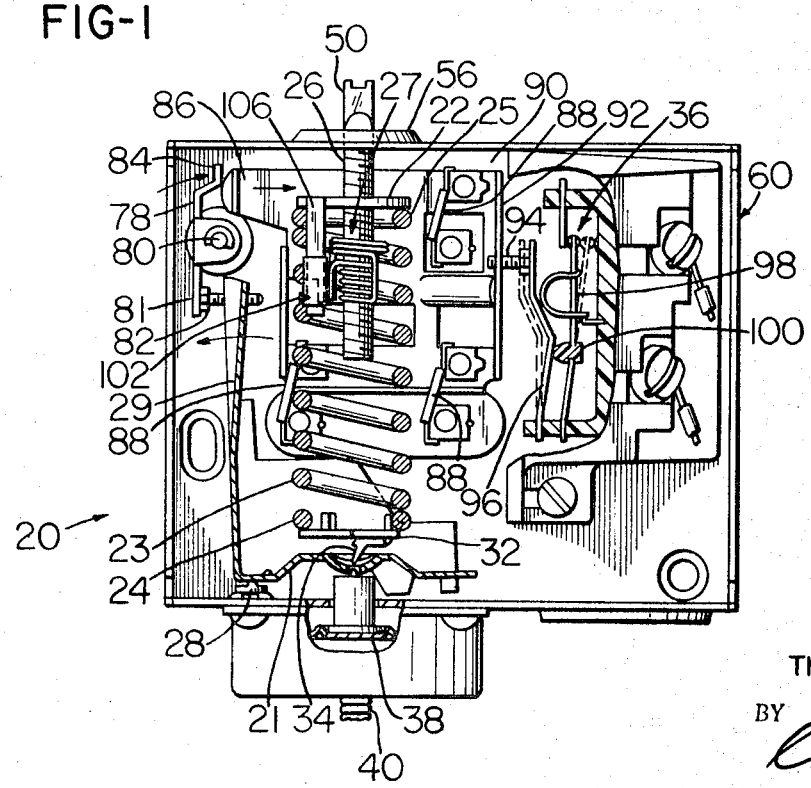
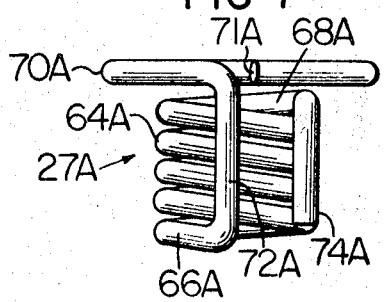
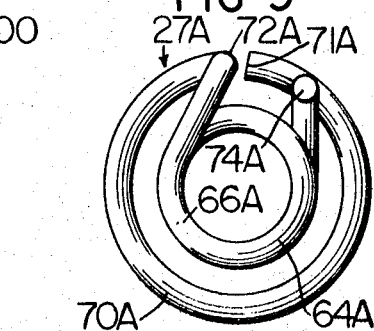
INVENTOR.
THEODORE Y. KORSGREN
BY *Candor & Candor*
HIS ATTORNEYS Dec. 1, 1970 T. Y. KORSGREN 3,543,604
SELF-LOCKING, ADJUSTABLE LIMIT STOP MEANS FOR A CONTROL DEVICE
Filed Oct. 30, 1968 2 Sheets-Sheet 2
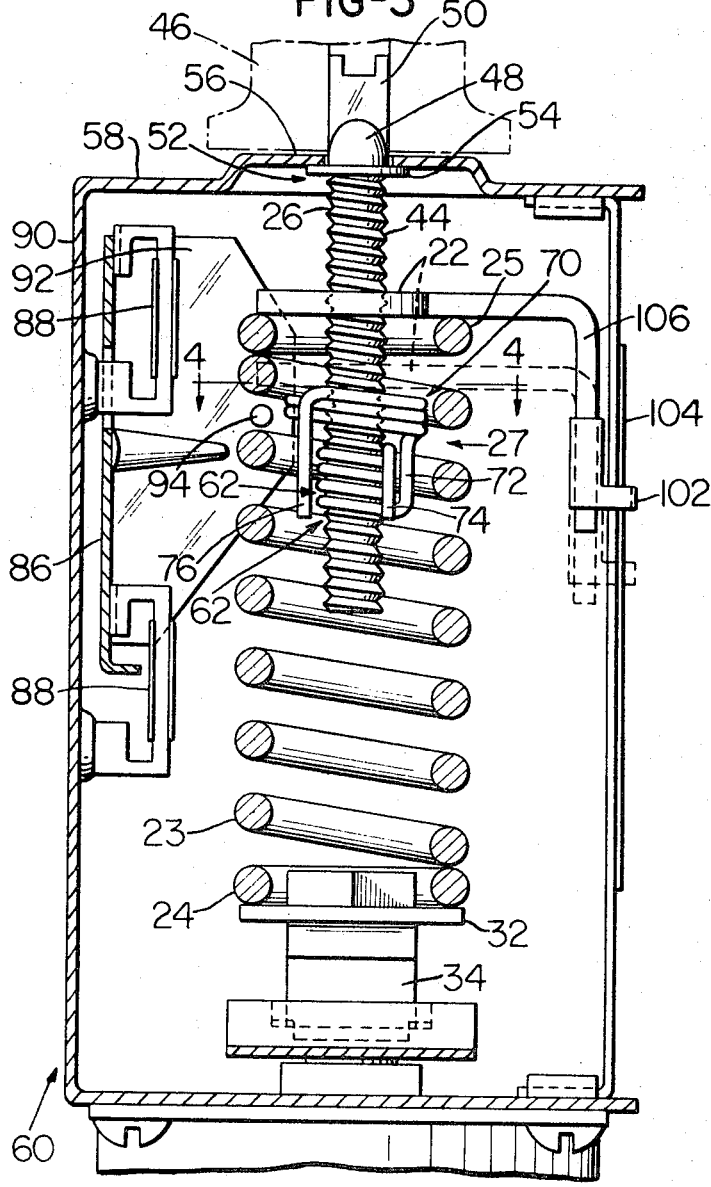
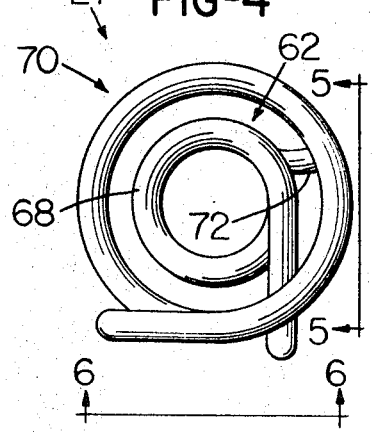
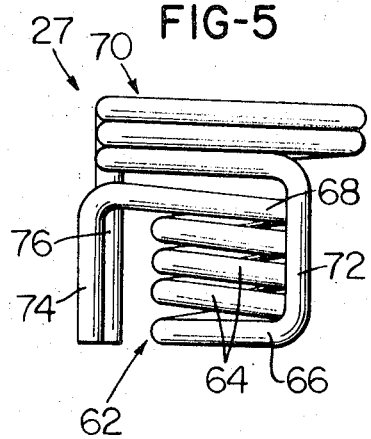
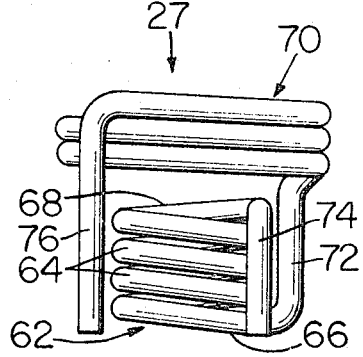
INVENTOR.
THEODORE Y. KORSGREN
BY
Candor & Candor
HIS ATTORNEYS

United States Patent Office 3,543,604
Patented Dec. 1, 1970

3,543,604
SELF-LOCKING, ADJUSTABLE LIMIT STOP MEANS FOR A CONTROL DEVICE
Theodore Y. Korsgren, Orange, Conn., assignor to Robertshaw Controls Company, Richmond, Va., a corporation of Delaware
Filed Oct. 30, 1968, Ser. No. 771,859
Int. Cl. G05g 5/04
U.S. Cl. 74—531                              26 Claims

ABSTRACT OF THE DISCLOSURE

A control device includes a movable control member and an adjusting member. A spring has an actuated spring portion actuated by the control member, and has an arrested spring portion arrested by the adjusting member to produce an adjustable spring load on the control member. A threaded screw has threads engaging the adjusting member to vary the position of the arrested spring portion and to vary the spring load on the control member. A self-locking adjustable limit stop is provided on the screw and comprises a spring wire wrapped around the threads of the screw and is adjustable along the length of the screw. The spring wire cooperates with the screw and the adjusting member to provide the self-locking, adjustable limit stop.

---

This invention relates to a self-locking, adjustable limit stop means for a control device.

A feature of this invention includes a self-locking, adjustable limit stop means for the control device comprising an adjusting threaded screw with a spring wire means longitudinally adjustable along the length of the screw, which limits rotation of the screw beyond an adjusted selected limit.

Another feature of this invention includes a movable control member and an adjusting member of the control device. Spring means is provided with an actuated spring portion actuated by said control member and with an arrested spring portion arreseed by said adjusting member to produce an adjustable spring load on the control member. Threaded screw means have threads engaging said adjusting member to vary the position of said arrested spring portion to adjust the spring load on the control member when such screw means is radially rotated. A self-locking, adjustable limit stop means is provided on such screw means to be engaged by said adjusting member to stop said radial rotation while said stop means is engaged by said adjusting member.

Another feature of this invention includes a spring wire means wrapped around a portion of the threads of the screw means to be engaged by said adjusting member to stop said radial rotation.

Another feature includes wrapping means to cause said spring wire means to wrap tightly around said screw means when engaged by said adjusting member to produce a self-locking action on said spring wire means.

Another feature includes means to cause said adjusting member to impart such wrapping action on the far portion of such spring wire means to produce such self locking action.

Another feature includes means to change the location of said spring wire means on said screw means, such as by arresting the near portion of the spring means while rotating said screw means to move said spring wire means longitudinally along said screw means.

Other features are apparent from this description, the appended claimed subject matter, and/or the accompanying drawings, in which:

FIG. 1 is a diagrammatic vertical view, partly in elevation and partly in cross section, of a control device provided with a self-locking, adjustable limit stop means for a control device, according to this invention.

FIG. 2 is a view similar to FIG. 1, in which an indicating scale and other parts of the device have been placed in front of certain parts shown in FIG. 1.

FIG. 3 is an enlarged vertical view transverse to FIGS. 1 and 2 and showing certain parts taken along the line 3—3 of FIG. 2.

FIG. 4 is an enlarged plan view of the adjustable, self-spring wire means separated from the screw means, and taken along the line 4—4 of FIG. 3.

FIG. 5 is a side view of FIG. 4, taken along the line 5—5 of FIG. 4.

FIG. 6 is a side view of FIG. 4, taken along the line 6—6 of FIG. 4.

FIGS. 7, 8, end 9 are respectively side, top, and bottom view of another embodiment of the self locking spring wire means.

Certain words are used in this specification and the claimed subject matter indicating direction, relative position, and the like. Such words are used for the sake of brevity and clearness. It is to be understood, however, that such words are used only in connection with the views of the drawings, and that in actual use, any parts described by such words may have entirely different direction, relative position, and the like. Examples of such words are "vertical," "horizontal," "upper," "lower," and the like.

A control device 20, according to this invention, may include a movable control member or lever 21, and a spring load adjusting member 22. A spring means 23 may have an actuated spring portion or lower spring end 24 indirectly actuated by the control member 22. Such spring means 23 may have an arrested spring portion or upper spring end 25 arrested by the adjusting member 22 to produce an adjustable spring load on the control member 21. Vertical adjustment of the adjusting member 22 produces such adjustable spring load on the conerol member 21.

The adjusting member 22 may be vertically adjusted by threaded engagement with a rotatable screw means 26. A spring wire means 27 is longitudinally adjustable along the length of the screw means 26 in a manner to be described. Such spring wire means 27 forms a self locking adjustable limit stop means 27 to be engaged by the adjusting member 22 while the screw means 26 is being rotated, and to stop said rotation while such stop means or spring wire means 27 is engaged by said adjusting member 22, as shown in dotted lines and in a manner to be more fully described.

The spring means 23 may be a compression helical spring, as shown. The actuated spring portion 24 may engage a pivoted plate 32 which may have a pivot member 34 which pivotally engages and rocks the control member of lever 21 in any suitable manner, about fulcrum 28 as diagrammatically indicated in FIGS. 1–3.

For example, the vertical arm 29 of control member or lever 21 may be connected to and control a switch 36 to open and close the same in response to fluid pressures imparted under the bellows or diaphragm 38 from the fluid pressure conveying pipe 40. The exact details of the actuating means between the lever 22 and switch 36 are not, of themselves, necessary to this invention, and, in general, are now well known in the art. Any well known actuating means between the lever 21 and switch 36 may be used for the purposes of this invention.

The threaded screw means or screw 26 may have threads 44 which engage the adjusting member 22 and indirectly engage the arrested spring portion 25 through the medium of the adjusting member 22, to vary the vertical position of the arrested spring portion 25 to adjust the spring load on the control member 21 when such screw means 26 is radially rotated about a longitudinal axis.

Such rotation may be accomplished by manually turning the adjusting knob 46 which may be rotationally fixed to the upper end of the screw means 26 in any suitable manner, such as by a frictional and slidable key construction 48 provided on a rectangular screw end 50. However, the exact details of such knob 46, key construction 48, and square screw end 50 are not, of themselves, necessary to this invention, and any suitable means may be provided to rotate the screw 26.

Longitudinal holding means 52 to hold the screw means 26 longitudinally positioned while said screw means 26 is being radially rotated may be provided. Such holding means 52 may take the form of a flange or disc 54 which may be secured to the screw means 26, as by soldering or the like. Such disc 54 may engage the raised dome 56 on the upper wall 58 of the casing 60, which casing may be used to encase the control device 20, if desired. An upward spring load or stress is imparted by the upper spring end 25, to the adjusting member 22, and to the screw 26 which is arrested or held by the disc 54 against dome 56, to hold the screw 26 longitudinally fixed while the screw 26 is being rotated.

According to this invention a self-locking adjustable limit stop means or spring wire means 27 may be provided on the screw means 26 to be engaged by the adjusting member 22 while radial rotation is being imparted to the screw means 26. Such stop means 27 stops such radial rotation of the screw means 26 while said stop means 27 is engaged by such adjusting member 22. Such self locking, adjustable limit stop means may be in the form of the spring wire means 27, which is readily adjustable along the length of the screw means 26 to select a new stop position and is self locking before and after such longitudinal adjustment to such new stop position.

The spring wire means 27 may have a wrapped coil part 62 wrapped around a portion of the screw threads 44, such as in the form of a plurality of wrapped spring wire coils 64, with a slight frictional fit around screw threads 44. Such wrapped coil part 62 normally remains at its selected vertical level and preferably is indirectly engaged by the adjusting member 22, when said adjusting member 22 is downwardly adjusted by radial rotation of the screw means 26, as shown in dotted lines in FIG. 3. The construction is such that the wrapped coils 64 are "jammed" or more tightly wrapped around the threads 44 of screw 26 when such indirect contact is made between the downwardly moving adjusting member 22 and the constant level coils 64, which rotate with the longitudinally fixed screw 26, but normally do not move up or down the screw. When such "jamming" effect takes place, the screw rotation is stopped and downward adjustment of the adjusting member 22 is likewise stopped. That is, a stop limit has been provided or established for the downward adjustment of adjusting member 22.

This "jamming" effect is provided by the characteristics of a slight frictional fit of the wrapped coils 64 around the radially rotatable, but longitudinally fixed, screw means 26. In the embodiment illustrated, the screw 26 is a "left hand" threaded screw so that the adjusting member 22 is downwardly adjusted when the screw 26 is rotated clockwise (looking down), and vice versa. As long as the wrapped coils 64 are allowed to rotate with the screw 26 without interference from the adjusting member 22, or the like, such coils 64 rotate with the screw 64 at a constant level. However, if rotation of the lower or "far" wrapped coil 66 is stopped or "jammed" a tightening wrapping action is produced on all of the wrapped coils 64, 66 and the near or upper wrapped coil 68, and the clockwise rotation of the screw 26 is stopped. On the other hand, if the "near" or upper wrapped coil 68 is stopped or "jammed" against rotation action by any means while the screw 26 is rotating clockwise (looking down), then the wrapped coils 64, 66 and 68 become loose and they move down the screw 26 and may assume a new position when the jamming action is discontinued. Therefore the spring wire means or construction 27 can be used to provide a self locking adjustable limit stop means 27 which provides a screw stopping action when the "far" coil is "jammed" and a vertical adjusting action when the "near" coil is rotationally stopped but held vertically free.

Conversely, if the screw 26 is rotated counterclockwise (looking down), and the lower wrapped coil 66 is held against rotation but vertically movable, such coil 66 becomes the "near" coil and the wrapped coils 64, 66 and 68 become freely movable up the threads 44 of the screw 26, so that the spring wire means or assembly 27 can be upwardly adjusted to a new position along the axis of the screw.

These characteristics of the spring wire means or assembly 27 can be advantageously used in connection with the controller 20, for example, as herein disclosed.

The spring wire means assembly 27 may be provided with an upper bank of coils 70 which are loosely wrapped or spaced around the screw 26 and are connected to the lower slightly frictionally wrapped coil 66 by the vertical connector 72. This bank of coils 70 is contacted by the adjusting member 22 when the screw 26 is rotated clockwise to the stop limit established by the spring wire means 27 as shown in dotted lines in FIG. 3. At that time a frictional engagement and jamming action occurs between the adjusting member 22 and the bank of coils 70 which stops rotation of the coils 70, vertical member 72 and lower or far coil 66. This jams or stops clockwise rotation of screw 26 and limits downward travel of adjusting member 22. The bank of coils 70 may provide a gradual braking or cushioning action, if desired.

A vertical end member 74 of the stop limit 27 is connected to the upper frictionally wrapped member 68 for use in adjusting the spring wire means 27 downwardly along the screw means 26 in a convenient manner. The vertical member 74 may be held against clockwise rotation, but freely vertically, movable, by any suitable tool, such as a screwdriver or the like. When so held, and with the screw 26 rotated clockwise, the spring wire means or limit stop 27 can be moved downward to any new lower position. This is because the upper frictionally wrapped coil 68 becomes the "near" coil and loosens all of the wrapped coils 64, 66 and 68 to allow them to move down the screw 26.

The limit stop or spring wire means 27 may be moved upwardly along the screw means 26 by rotationally stopping a vertical member 76 while maintaining it vertically free and while rotating the screw means 26 counterclockwise. The vertical member 76 is connected to the bank of coils 70 which bank is connected to the vertical member 72 and to the lower frictionally wrapped coil 66. The coil 66 becomes the "near" coil when the screw 26 is rotated counterclockwise, and this loosens all the frictionally wrapped coils 64, 66 and 68. This causes the limit stop or spring wire means 27 to be adjusted upwardly to a new upper position along the screw 26.

The power transmission from the lever 21 and vertical lever arm 29 to the snap switch 36 may, if desired, include a reversing lever 78, which is pivoted at pivot 80. The lower end 81 of the lever 78 is engaged by an adjustable screw 82 on the arm 29, and the upper end 84 of the lever 78 engages a vertical shuttle plate 86. The shuttle plate 86 has secured thereto U-shaped leaf spring supports 88 which have their lower ends secured to the rear wall 90 of the casing 60. The supports 88 bias the plate 86 leftwardly, in FIG. 1, against the upper end 84 of the reversing lever 78. The shuttle plate 86 has an end flange 92 which is provided with an adjustable screw 94 which engages the leftwardly biased actuating blade 94 of the snap switch 36. The switch 36 may have a snap blade 98 which can snap rightwardly and leftwardly when actuated by blade 96 through the action of insulating button 100, in any desired manner, not pertinent to this invention.

This invention provides a limit stop to limit the capability of adjustment to some point less than the full range of adjustment. Such limit stop can be pre-set at the factory merely by adjusting the longitudinal level of the limit stop 27 at the desired longitudinal level along the screw means 26. The limit stop 27 may be applied to the screw 26 and can be adjusted upwardly or downwardly by rotationally arresting either of the vertical members 74 and/or 76 while maintaining such members 74 and/or 76 longitudinally free along the screw 26. The screw 26 is radially rotated either clockwise or counterclockwise, as the case may be, to obtain the desired longitudinal position along the screw 26.

The invention is applicable to either a left hand screw, or a right hand screw, as desired. The stop limit means 27 may be altered as to the direction of coil construction to adapt it to such screws, as is now obvious.

In the operation of this invention, the movable member means 21 is responsive to a condition or fluid pressure such as at the diaphragm 38. Such member means 21 is effective on the portion or end 24 of the spring means 23. The adjusting member means 22 is adjustably effective on the portion or end 25 of the spring means 23. The threaded screw means 26 has thread means 44 which modify the longitudinal position of the adjusting means 22 along the screw means 26, by radial rotation of such screw means.

The self-locking adjustable limit stop means 27 on the screw means is effective to stop the radial rotation when the adjusting member means 22 has been adjusted to a limit position established by the limit stop means 27, such as at the dotted line position of FIG. 3.

The limit stop means 27 comprises spring wire means 27 in which the coil means are effective on the thread means 44 and the adjusting member means 22 to stop said radial rotation. The coil means has a plurality of coils 64, 66 and 68 which slightly frictionally engage the thread means 44 which are effective on the adjusting member means 22 to stop said radial rotation. Such spring wire coils 64, 66 and 68 are affected by said adjusting member means 22 to stop such rotation.

When adjustment of the adjusting member means 26 has been made to the stop position or dotted line position of FIG. 3, such adjusing member 22 frictionally engages the loosely spaced coils 70 and stops their rotation. This causes a rotation stopping movement of the vertical member 72 and of the then far coil 66. This causes an increased friction in the frictional coils 64, 66 and 68 to stop radial rotation of the screw means 26.

When a suitable tool is used to stop rotation of the vertical member 74 while maintaining it vertically free to stop rotation of the then near coil 68, the stop means 27 is moved downwardly along the screw means to a new stop position.

To adjust the stop limit means 27 upwardly, a suitable tool is used to stop rotation of the vertical member 76 while maintaining it vertically free while the screw means 26 is rotated counterclockwise. This causes the coil 66 to become the "near" coil to loosen all of the frictional coils 64, 66 and 68 and permit the stop limit means 27 to move upwardly.

FIGS. 7–9 show another embodiment of a self-locking spring wire means assembly 27A which is somewhat similar in construction and function to the assembly 27 of FIGS. 4–6. The parts of FIGS. 7–9 which correspond substantially to similar parts of FIGS. 4–6 are designated with similar numbers, but with the suffix A added thereto. When so designated with the suffix A, such parts of FIGS. 7–9 are to have substantially the same construction and function as the corresponding parts of FIGS. 4–6 without repeated description. However, the coil bank 70 of FIGS. 4–6 has been changed to the single coil construction 70A, which has substantially the same function as the bank 70. Additionally, the vertical member 76 of FIGS. 4–6 has been omitted in FIGS. 7–9, and the coil 70A has been cut off at 71A, which has no corresponding element in FIGS. 4–6. The adjusting function of vertical member 76 has been transferred to the vertical member 72A. Hence when it is desired to move the spring wire means 27A of FIGS. 7–9 upwardly along the screw means 26 the stopping tool can be applied to stop the vertical number 72A instead of the omitted member 70. The vertical member 72A is connected to the lower frictionally wrapped coil 66A with the same upwardly adjustment of the spring wire means 27A. In FIGS. 7–9, the coils 66A have been increased in length slightly to bring the vertical member 72A in a convenient position to be stopped by the stopping tool, or screw driver.

An indicator 102 may be supported in front of the indicator plate 104 by the arm 106, which is connected to the adjusting member 22. The indicator 102 shows the corresponding positions of the adjusting member on the scale 108 of the plate 104. This shows the adjusted position of the adjusting member. The scale 108 may be marked to indicate the factory adjusted position of the stop limit of the adjusting member if desired.

A new, useful and unobvious self-locking, adjustable limit stop means for a control device has thus been provided.

While the form of the invention now preferred has been disclosed as required by statute, other forms may be used, all coming within the scope of the claimed subject matter which follows.

What is claimed is:

1. A control device comprising:
a movable control member of said device;
an adjusting member of said device;
spring means having an actuated spring portion actuated by said control member and having an arrested spring portion arrested by said adjusting member to produce an adjustable spring load on said control member;
threaded screw means having threads threadedly engaging said adjusting member to vary the position of said arrested spring portion to adjust said spring load on said control member when said screw means is radially rotated about a longitudinal axis;
longitudinal holding means to hold said screw means longitudinally fixed while said screw means is being radially rotated; and
self-locking adjustable limit stop means on said screw means to be engaged by said adjusting member while radial rotation is being imparted to said screw means and to stop said radial rotation while said stop means is engaged by said adjusting member.

2. A control device according to claim 1 in which said limit stop means comprises a spring wire means wrapped around a portion of said threads of said screw means to be engaged by said adjusting member to stop said radial rotation of said screw means.

3. A control device according to claim 2 in which wrapping means are provided to cause said adjusting member to impart a wrapping action on a far portion of said wire means when said adjusting member engages said wire means to cause a self-locking action on said wire means around said screw means.

4. A control device according to claim 3 in which said wrapping means includes an extension of said spring wire means from said far portion of said wire means toward said adjusting member and to be engaged by said adjusting member to impart said wrapping action on said far portion of said wire member.

5. A control device according to claim 1 in which said limit stop means comprises a spring wire means wrapped around a portion of said threads of said screw means to form a plurality of wrapped spring wire coils with a slight frictional fit around said threads and to be engaged by said adjusting member to stop said radial rotation of said screw means.

6. A control device according to claim 5 in which wrapping means are provided to cause said adjusting member to impart a wrapping action on the far wrapped spring wire coil when said adjusting member engages said spring wire means to cause a self-locking action on said wrapped spring wire coils around said screw means.

7. A control device according to claim 6 in which said wrapping means includes an extension of said spring wire means from said far wrapped spring wire coil toward said adjusting member and to be engaged by said adjusting member to impart said wrapping action on said far wrapped spring wire coil.

8. A combination according to claim 7 in which said extension of said spring wire means includes one or more near spring wire coil or coils which is or are larger than said wrapped spring wire coils and is or are loosely wrapped around said screw means and is or are connected to said far wrapped spring wire coil, and is or are engaged by said adjusting member to stop said radial rotation of said screw means.

9. A control device according to claim 1 in which longitudinal adjusting means are provided to adjust said limit means longitudinally along said screw means.

10. A control device according to claim 9 in which said limit stop means comprises a spring wire means wrapped around a portion of said threads of said screw means to be engaged by said adjusting member to stop said radial rotation of said screw means, and in which said longitudinal adjusting means include means to stop rotation of said spring wire means while maintaining said spring wire means longitudinally movable along said screw means.

11. A control device according to claim 10 in which wrapping means are provided to cause said adjusting member to impart a wrapping action on a far portion of said wire means when said adjusting member engages said wire means to cause a self-locking action on said wire means, and in which means are provided to cause an unwrapping action on a near portion of said wire means to adjust said wire means longitudinally along said screw means.

12. A control device according to claim 1 in which said limit stop means comprises a spring wire means wrapped around a portion of said threads of said screw means to form one or more wrapped spring wire coil or coils with a slight frictional fit around said threads and to be engaged by said adjusting member to stop said radial rotation of said screw means, and in which means are provided to produce an unwrapping action on said wrapped spring wire coil or coils to adjust said spring wire means longitudinally along said screw means.

13. A control device comprising:
movable control member means;
adjusting member means;
spring means movably responsive to said control member means and adjustably responsive to said adjusting means;
threaded screw means having thread means modifying the longitudinal position of said adjusting means along said screw means by radial rotation of said screw means;
and self-locking adjustable limit stop means on said screw means effective to lock on said screw means and stop said radial rotation when said adjusting member means has been adjusted to a limit position established by said limit stop means.

14. A control device comprising:
movable control member means;
adjusting member means;
spring means movably responsive to said control member means and adjustably erspponsive to said adjusting means;
threaded screw means having thread means modifying the longitudinal position of said adjusting means along said screw means by radial rotation of said screw means;
and self locking adjustable limit stop means on said screw means effective to stop said radial rotation when said adjusting member means has been adjusted to a limit position established by said limit stop means, said limit stop means comprising spring wire means effective on said threaded screw means and said adjusting member means to stop said radial rotation.

15. A control device according to claim 14 in which said spring wire means has coil means frictionally engaging said threaded screw means and effective on said adjusting member means to stop said radial rotation.

16. A control device according to claim 15 in which said coil means includes a plurality of spring wire coils slightly frictionally engaging said thread means.

17. A control device according to claim 16 in which said spring wire coils are affected by said adjusting member means to stop said radial rotation.

18. A control device comprising:
movable control member means;
adjusting member means;
spring means movably responsive to said control member means and adjustably responsvie to said adjusting means;
threaded screw means having thread means modifying the longitudinal position of said adjusting means along said screw means by radial rotation of said screw means;
and self-locking adjustable limit stop means on said screw means effective to stop said radianl rotation when said adjusting member means has been adjusted to a limit position established by said limit stop means, said limit stop means being longitudinally adjustable along said threaded screw means.

19. A control device according to claim 18 in which said limit stop means includes spring wire means effective on said threaded screw means and longitudinally adjustable on said screw means.

20. A control device according to claim 19 in which said spring wire means has frictional coil means frictionally engaging said threaded screw means and has means to cause increased friction to stop said radial rotation and decreased friction to adjust said coil means longitudinally along said screw means.

21. A control device according to claim 20 in which the far coil of said coil means causes said increased friction and in which the near coil of said frictional coil means causes said decreased friction.

22. A control device according to claim 21 in which far coil arresting means is provided and is actuated by said adjusting member means to cause said increased friction to stop said radial rotation.

23. A control device according to claim 22 in which near coil arresting means is provided to rotationally stop radial rotation of said near coil while freely permitting longitudinal movement along said screw means to longitudinally adjust said coil means along said screw means.

24. In combination:
spring means having an actuated spring portion and an arrested spring portion;
screw threaded means having threads threadedly moving said arrested spring portion to vary the position of said arrested spring portion when said screw threaded means is radially rotated about a longitudinal axis;
and self-locking, adjustable limit, stop means on said screw threaded means to be engaged by said arrested spring portion while said screw threaded means is being radially rotated with such engagement causing said stop means to lock on said screw threaded means and to thereby stop said rotation of said screw threaded means.

25. A combination according to claim 24 in which said stop means comprises a spring wire means wrapped around a portion of said threads of said screw means and to be engaged by said arrested spring portion and to lock said spring wire means to said screw threaded means to stop said rotation of said screw threaded means.

26. A combination according to claim 25 in which longitudinal adjusting means are provided to cause an unwrapping action of said spring wire means to adjust said spring wire means longitudinally along said screw threaded means.

References Cited

UNITED STATES PATENTS

| | | | |
|---|---|---|---|
| 2,868,030 | 1/1959 | Forwald | 192—141 XR |
| 2,620,911 | 12/1952 | Krell | 192—141 |
| 3,293,925 | 12/1966 | Linsley | 192—141 XR |
| 3,326,054 | 6/1967 | Canick et al. | 74—10.2 |
| 3,353,643 | 11/1967 | Adamson et al. | 74—10.2 XR |

FRED C. MATTERN, JR., Primary Examiner

F. D. SHOEMAKER, Assistant Examiner

U.S. Cl. X.R.

74—10.2, 424.8; 192—141